United States Patent [19]

Fowler

[11] 4,024,382

[45] May 17, 1977

[54] LORAN COMPENSATED MAGNETIC COMPASS

[75] Inventor: John T. Fowler, Winthrop, Mass.

[73] Assignee: The Laitram Corporation, New Orleans, La.

[22] Filed: Sept. 8, 1975

[21] Appl. No.: 611,525

[52] U.S. Cl. .............................. 235/150.26; 33/356
[51] Int. Cl.² ...................................... G01C 21/20
[58] Field of Search ..... 235/150.26, 151.3, 150.27, 235/150.25, 150.53; 340/347 DD; 33/317 D, 317 R, 319, 325, 326, 356, 363 R; 318/580; 343/114

[56] References Cited

UNITED STATES PATENTS

| | | | |
|---|---|---|---|
| 3,737,635 | 6/1973 | Hastings | 235/150.26 |
| 3,911,255 | 10/1975 | Dewar et al. | 235/150.25 |
| 3,937,943 | 2/1976 | DeBrunner et al. | 235/151.3 |

Primary Examiner—Malcolm A. Morrison
Assistant Examiner—Errol A. Krass
Attorney, Agent, or Firm—Weingarten, Maxham & Schurgin

[57] ABSTRACT

A magnetic compass system in which an output signal indication is produced of true heading. An electronic navigation receiver such as a Loran or Omega receiver is employed to provide sequential indications of present position which are processed to produce a signal representing the average course made good for a selected heading. The course made good signal is processed with a signal indication of magnetic compass heading to correct for deviation and variation errors and yield an output signal representing true heading.

7 Claims, 1 Drawing Figure

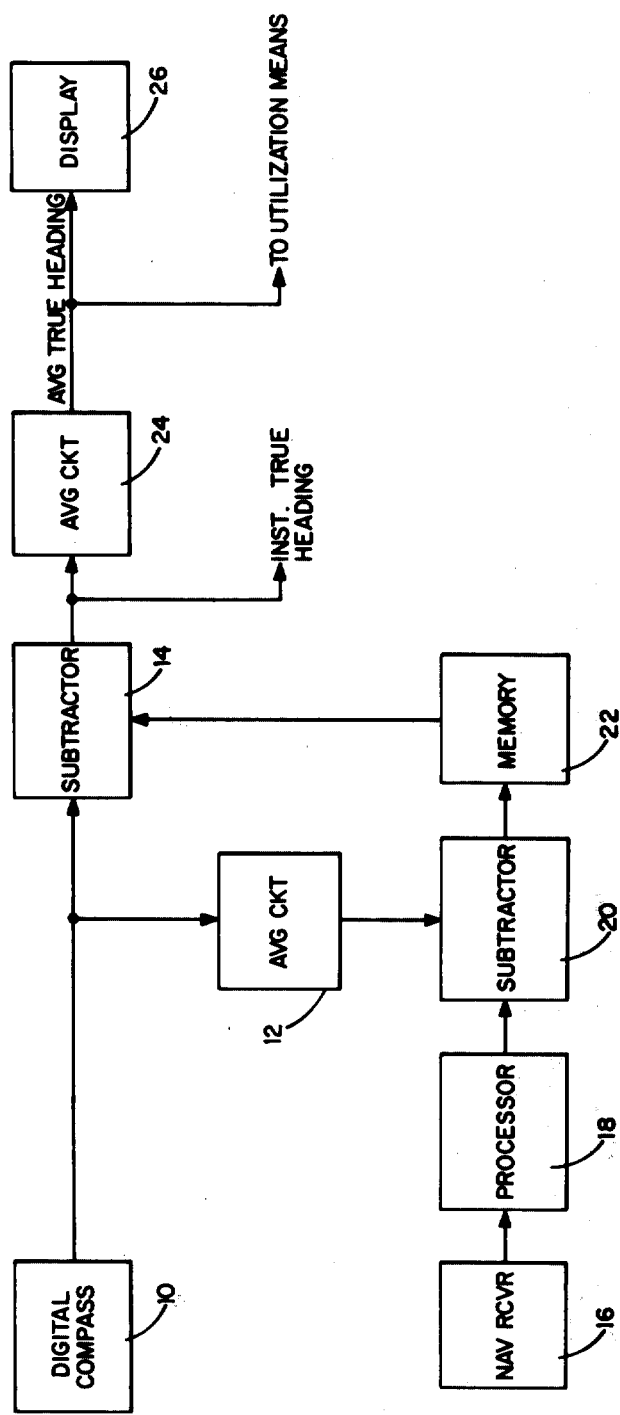

LORAN COMPENSATED MAGNETIC COMPASS

SUMMARY OF THE INVENTION

This invention relates to magnetic compasses and more particularly to an electronic remote reading compass system providing an electrical signal indication of compass heading corrected for true course indication.

BACKGROUND OF THE INVENTION

Magnetic compasses are subject to magnetic variation and magnetic deviation errors which prevent the direct indication of true compass heading. Magnetic deviation is the difference between true and magnetic north, which difference varies from location to location in accordance with the particular configuration of the earth's magnetic field at a given location. Magnetic variation, which also results in compass error, is caused by local magnetic effects such as masses of magnetizable or magnetic material including the hull of a vessel aboard which a compass is employed. Magnetic variation is conventionally compensated by use of correcting spheres which are magnetizable iron masses positioned with respect to the compass to compensate for the local error. Deviation correction is accomplished by a correction table or chart setting forth the relationship between true and magnetic headings for a specific geographic region.

Remote reading magnetic compasses are known wherein an electrical signal indication is provided which is representative of compass heading. Such remote reading compasses are especially useful since a plurality of displays can be provided remotely from the compass itself for indicating at various positions compass heading via a digital or other suitable display. However, such compasses are subject to the same variation and deviation errors of all magnetic compasses.

SUMMARY OF THE INVENTION

Briefly, the present invention provides a magnetic compass system in which an output signal indication is produced of true heading without the magnetic errors usually suffered by a magnetic compass. An electronic navigation receiver such as a Loran or Omega receiver is employed to provide sequential indications of present position which are processed to produce a signal representing average course made good for a selected heading. This course made good signal is employed to correct the compass signal for its deviation and variation errors such that an output signal is produced representing true heading and which can be employed for display or other intended purposes.

DESCRIPTION OF THE DRAWING

The invention will be more fully understood from the following detailed description taken in conjunction with the accompanying drawing in which the single FIGURE is a block diagram of a compass system embodying the invention.

DETAILED DESCRIPTION OF THE INVENTION

Referring to the drawing, there is shown a digital compass 10 operative to provide digital output signals representative of compass heading. These compass output signals are applied to an averaging circuit 12 and to a subtraction circuit 14. An electronic navigation receiver 16, typically a Loran C or Omega receiver, provides output signals representative of present position to a signal proccessor 18, the output of which is coupled to a subtraction ciircuit 20 which also receives a signal from averaging circuit 12. The output signal from circuit 20 is applied to a memory 22, the output of which is coupled to a subtraction circuit 14. The output of circuit 14 is, in turn, coupled to an averaging circuit 24, the output of which is coupled to a display 26 or to other utilization means such as an automatic pilot system.

The digital compass 10 is preferably of the type shown in U.S. Pat. No. 3,833,901, assigned to the assignee of this invention, wherein a plurality of serial pulses is provided of a number representative of sensed compass heading. The averaging circuit 12 is operative in response to the serial compass pulses or other appropriate compass output signal to provide a digital output signal representative of average compass heading over a predetermined time interval. The time constant of the present system is short compared to intended turning movement of a vessel aboard which the system is employed such that the system will not attempt to average intended turning movements. Rather, averaging will only occur for compass output signals which are varying with respect to a selected heading to which the vessel is being steered. The averaging circuit 12 is of the type shown in copending application Ser. No. 552,049, now U.S. Pat. No. 3,975,621 filed Feb. 24, 1975, of the present assignee and which provides a digital signal indication of the average of a present and previous heading, as well as the sense of the difference between these headings.

The signal processor 18 is operative in response to sequential readings from navigation receiver 16 to provide an output indication of average course made good with respect to a selected heading. The signal processor can be a special purpose computer operative to provide the intended course made good computation or can be a suitably programmed computer or processor providing the intended computational function.

A typical implementation of proccessor 18 is the subject of a technical report entitled "A Low Cost Loran-C Assist Device," published by the Applied Physics Laboratory, Johns Hopkins University, No. APL/JHU CPO34A (June 1974). In the processor of this report, the digital output signals of a Loran-C receiver representing delays between master and slave stations and therefore vessel position with respect to the stations, are processed to determine the latitude and longitude of the vessel and to then determine the heading and distance between successive positions thereby defining a course made good. By operation of the present invention, the digital output signals from processor 18 representing course made good are then employed in the manner described herein to compensate the digital output signal from the digital compass to yield a true heading indication.

The average course made good signal provided by signal processor 18 is representative of true heading and is not subject to the deviation and variation errors experienced by magnetic compass 10. The processor output signal and the signal from averaging circuit 12 representing average magnetic heading are processed by subtraction circuit 20 which provides an output signal denoting the average error between the magnetic and true headings. This error signal, typically in the form of a digital pulse train, is stored in memory 22. The error signal from memory 22 is then processed with the magnetic compass output signal by subtraction circuit 14 which provides an otuput signal indicating instantaneous true heading. This true heading signal can be averaged by averaging circuit 24, which is identical to the averaging circuit 12 to provide an output of average true heading. The instantaneous and average true heading signals can be applied to display or other utilization means.

The invention can be readily implemented in microcircuit form to provide a compact compass system yielding true heading information. It will be appreciated that the particular implementation of the novel system can be variously accomplished and the invention is not, therefore, to be limited by what has been particularly shown and described, except as indicated in the appended claims.

What is claimed is:

1. A magnetic compass system comprising:
   a magnetic compass providing an output signal representative of magnetic compass heading;
   an electronic navigation receiver providing an output signal representative of present position;
   means responsive to at least two sequential readings from said navigation receiver to provide an output representative of average course made good for a selected heading;
   an averaging circuit responsive to the output signal from said magnetic compass to provide a signal representative of average magnetic compass heading;
   first subtracting means receiving said signal representative of average course made good and said signal representative of average compass heading and providing an output signal representative of average error therebetween; and
   second subtracting means receiving said signal representative of average error and signal representative of magnetic compass heading and providing an output signal representative of true heading.

2. A magnetic compass system according to claim 1 wherein said first subtracting means includes:
   means for storing a representation of said average error.

3. A magnetic compass system according to claim 2 further including:
   a second averaging circuit operative in response to said output signal representative of true heading to provide an output signal representative of average true heading.

4. A magnetic compass system according to claim 1 wherein said averaging circuit has a time constant small compared to intended turning movements of a vessel aboard which the system is employed.

5. A magnetic compass system comprising:
   a digital magnetic compass providing a digital output signal representative of magnetic heading;
   means operative in response to output signals from an electronic navigation receiver representative of present position to provide a digital output representative of average course made good for a selected heading;
   an averaging circuit operative in response to the output signal from said magnetic compass to provide a digital signal representative of average magnetic heading;
   circuit means operative in response to said signal representative of average course made good and said signal representative of average heading to provide a digital signal representative of average error between said average course made good and average magnetic heading; and
   circuit means operative in response to said average error signal and magnetic compass output signal to provide a digital output signal representative of true heading.

6. For use with a remote reading magnetic compass providing an output signal indication of magnetic compass heading, a method of compensating the compass output signal to correct magnetic errors, said method comprising the steps of:
   providing an electrical output signal representative of magnetic compass heading;
   providing a first electrical signal representative of average course made good for a selected heading;
   providing a second electrical signal representative of average magnetic compass heading;
   combining said first and second electrical signals to provide a third signal representative of average error therebetween; and
   combining said output signal and said third signal to provide a compensated output signal representative of true heading.

7. A method according to claim 6 further including the step of averaging said compensated output signal to provide an output signal representative of average true heading.

* * * * *